Aug. 24, 1937.  A. KINGSBURY  2,091,206
THRUST BEARING
Filed Jan. 7, 1932   9 Sheets-Sheet 4
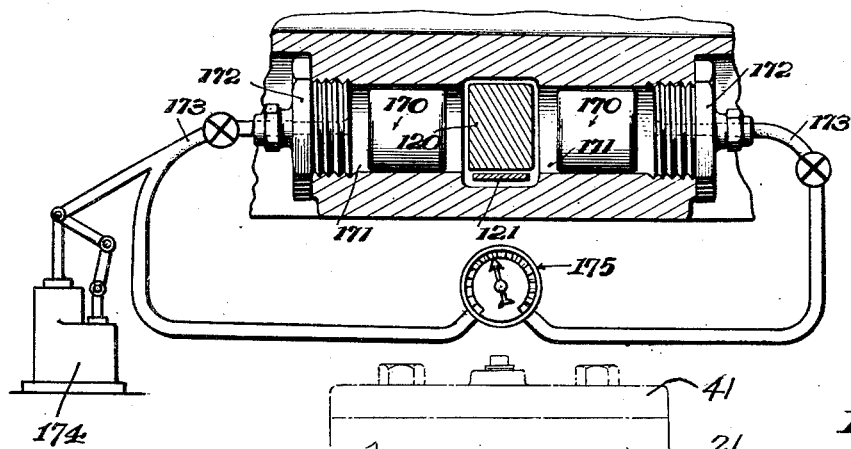
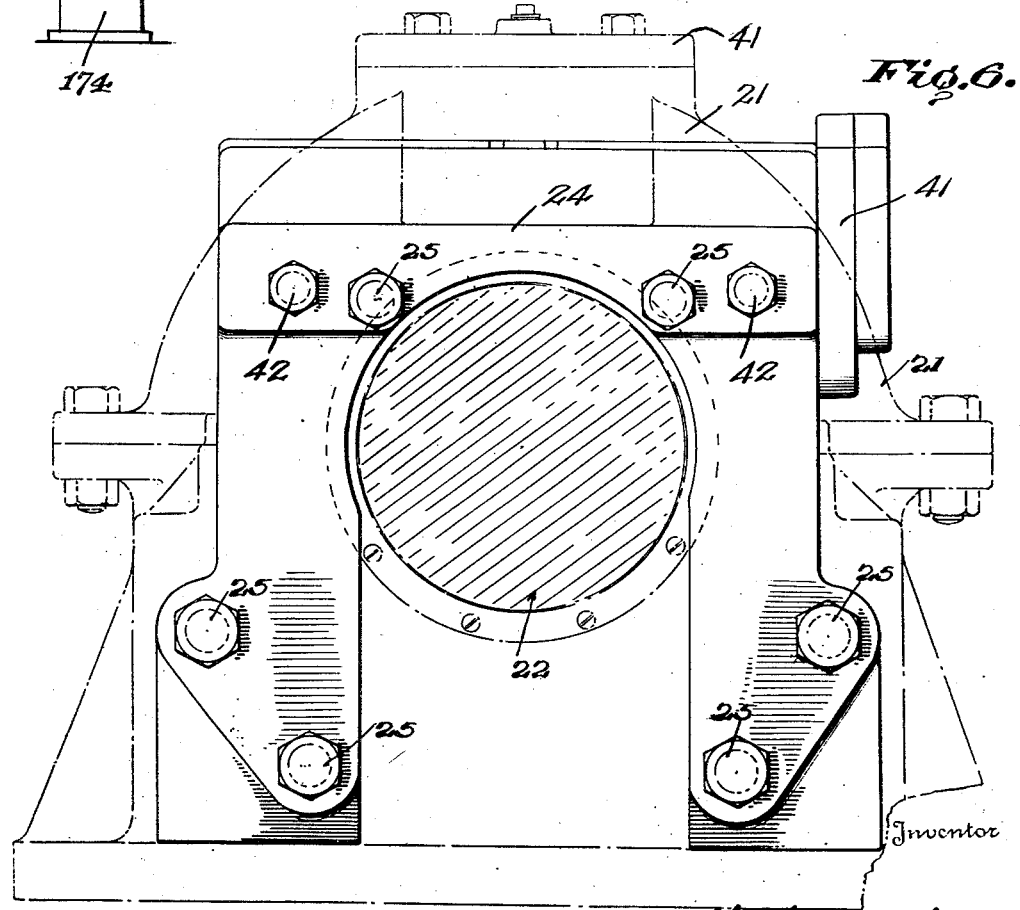

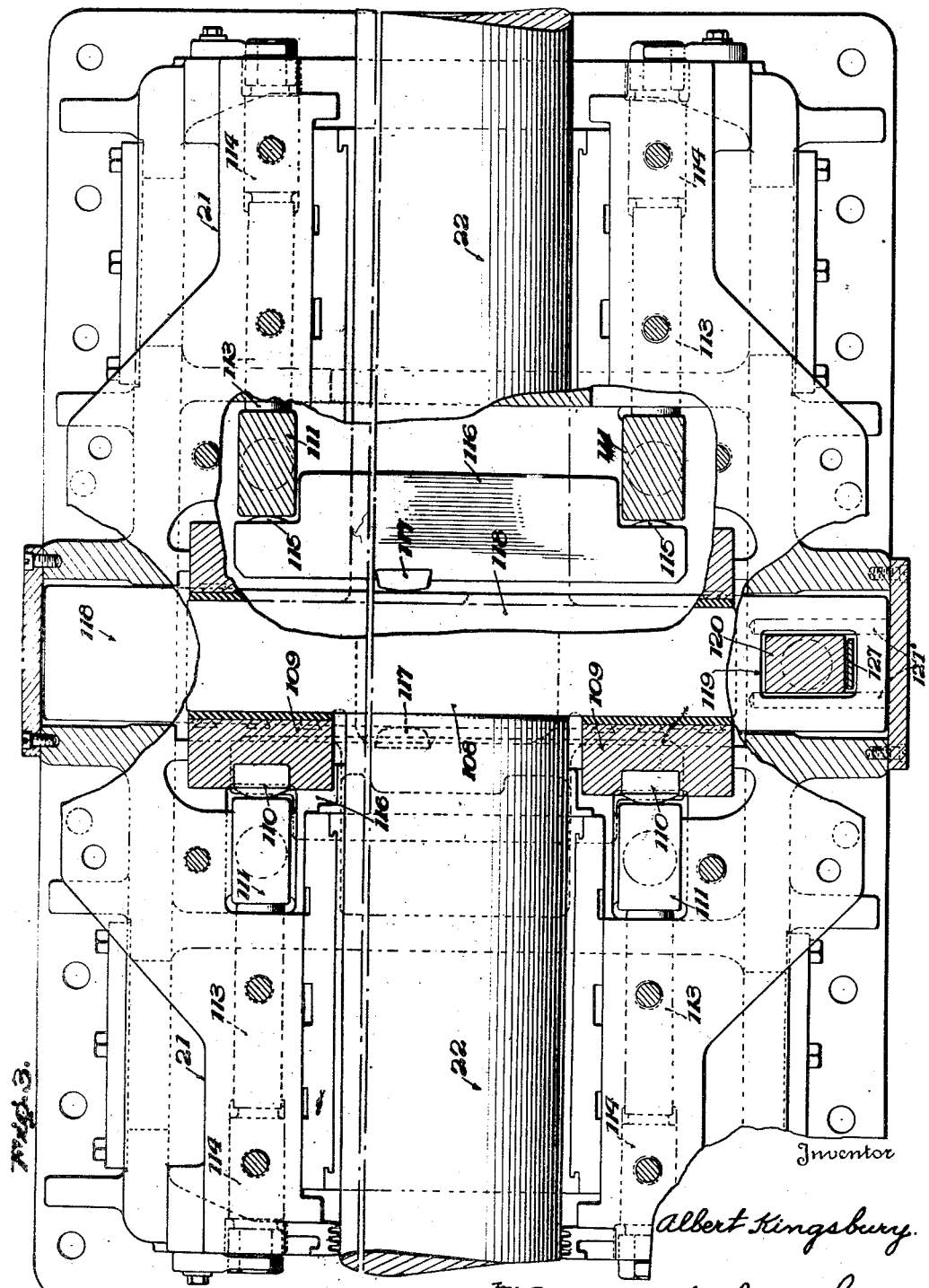

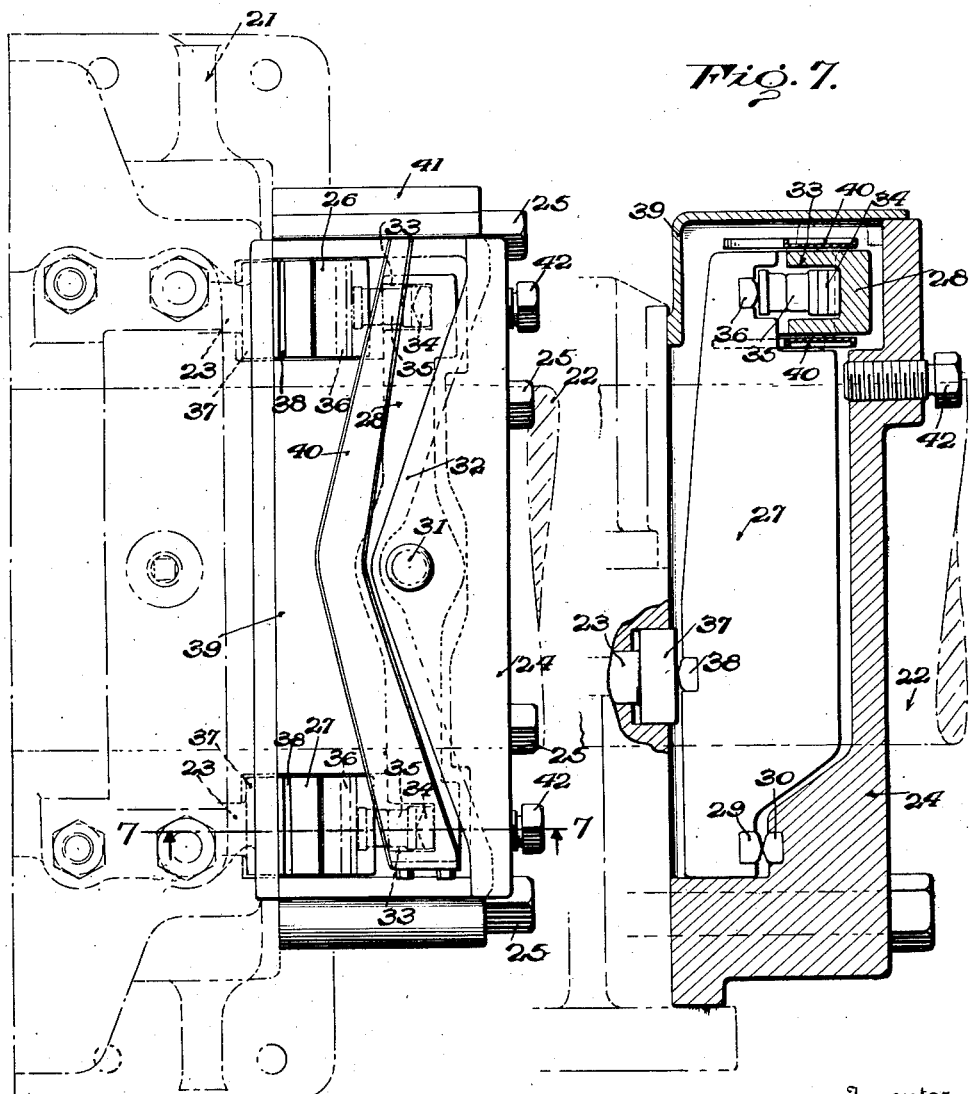

Aug. 24, 1937.　　A. KINGSBURY　　2,091,206
THRUST BEARING
Filed Jan. 7, 1932　　9 Sheets-Sheet 6
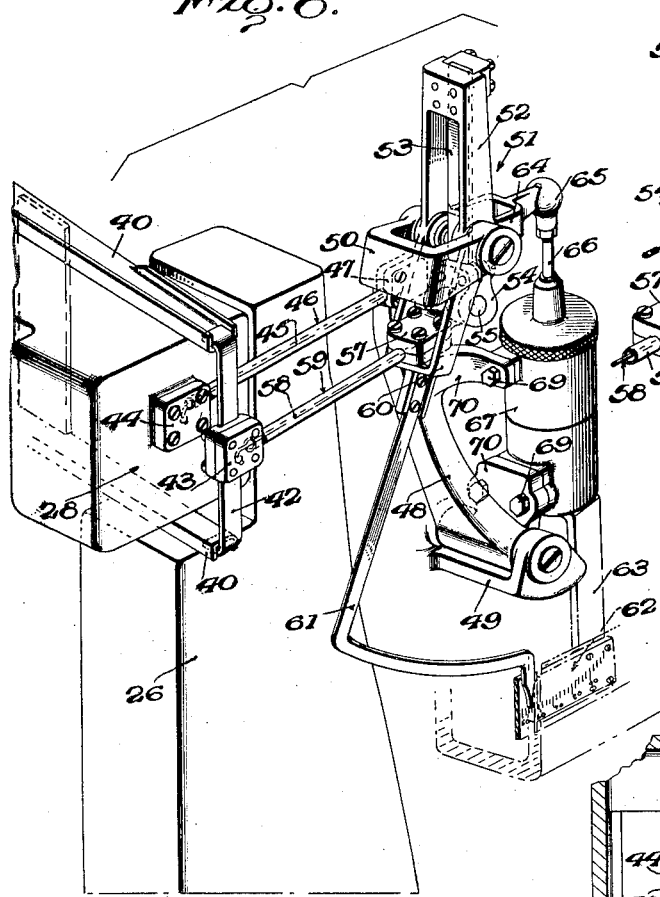
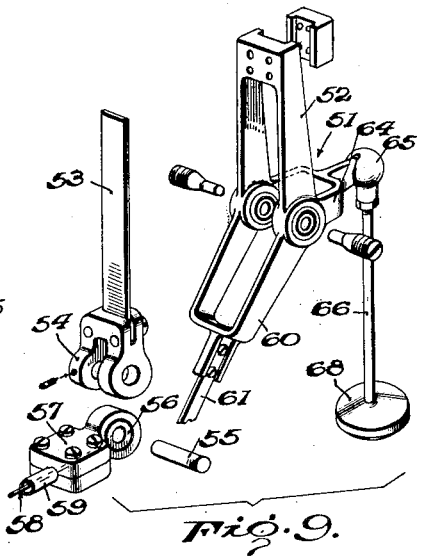
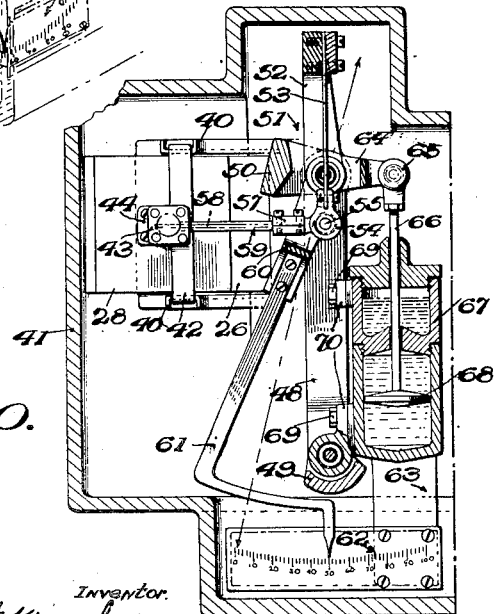
Inventor.
Albert Kingsbury
by Cameron, Kerkam + Sutton.
Attorneys

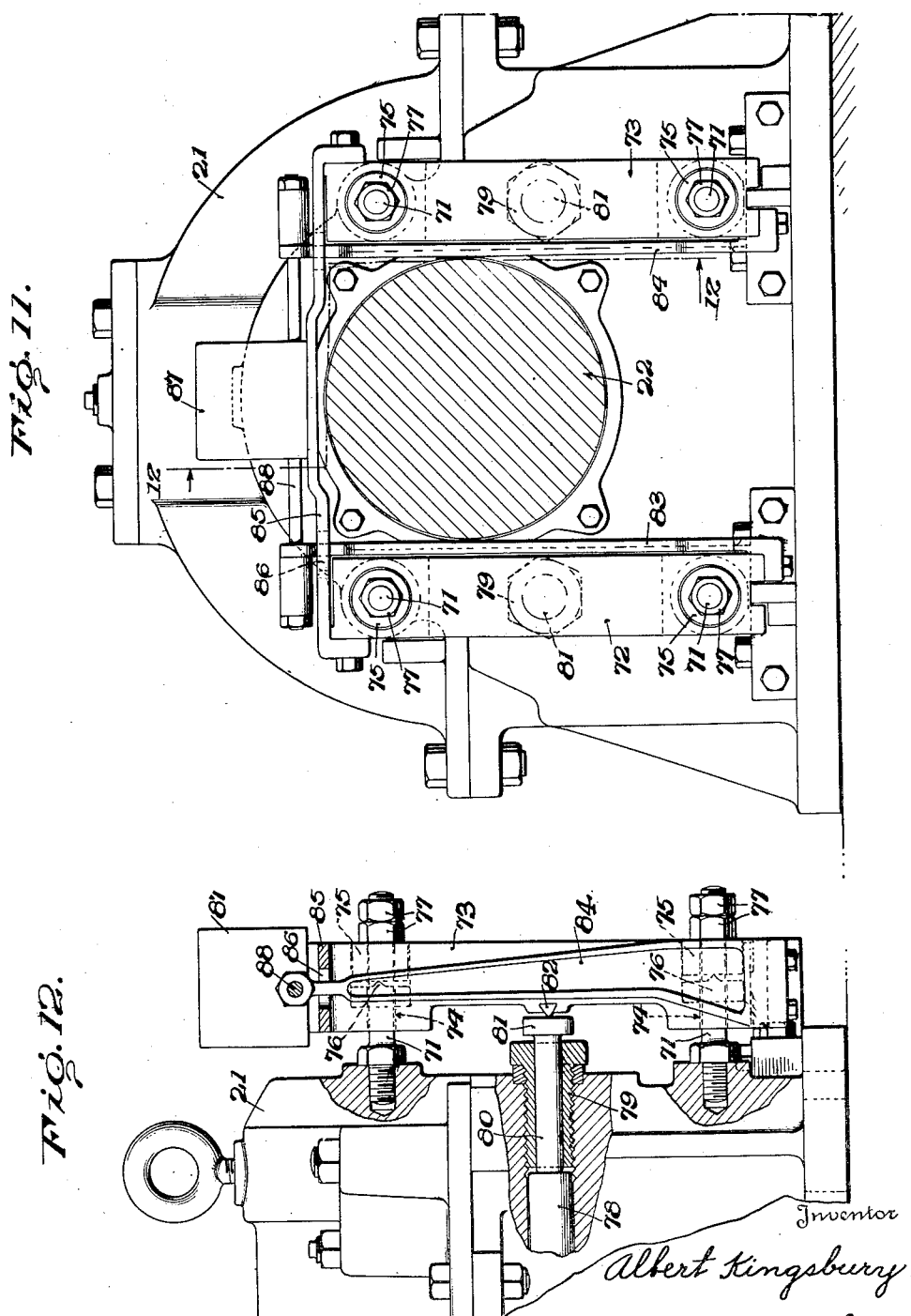

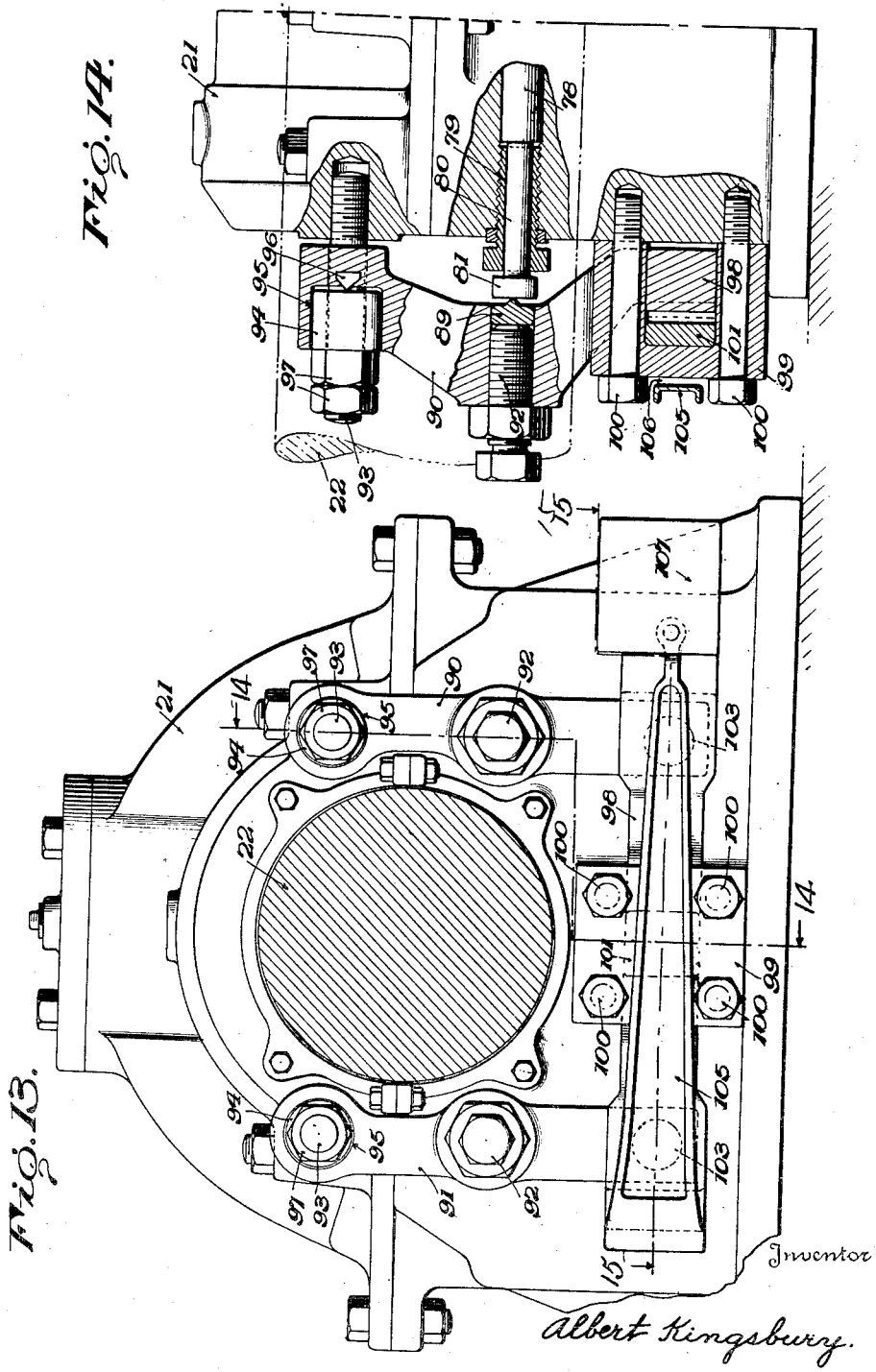

Aug. 24, 1937.                A. KINGSBURY                2,091,206
                              THRUST BEARING
                           Filed Jan. 7, 1932              9 Sheets-Sheet 9

Inventor

Albert Kingsbury.
By Cameron, Kerkam & Sutton.
                               Attorneys Patented Aug. 24, 1937

2,091,206

UNITED STATES PATENT OFFICE 2,091,206

THRUST BEARING

Albert Kingsbury, Greenwich, Conn., assignor to Kingsbury Machine Works, Inc., Philadelphia, Pa., a corporation of Delaware Application January 7, 1932, Serial No. 585,346

67 Claims. (Cl. 265—1)

This invention relates to bearings and more particularly to thrust bearings and means for measuring the thrusts applied thereto.

One of the objects of the invention is to provide novel mechanism for measuring and indicating the amount of thrust exerted upon a thrust bearing which mechanism is simple and rugged in structure, easily and quickly installed, and accurate and dependable in operation.

Another object is to provide a new and improved thrust measuring device embodying one or more flexible members to which the thrust is applied and by the amount of deflection of which said thrust is measured and indicated.

A further object is to embody in a thrust measuring device novel mechanism, either mechanically or fluid pressure actuated, for rendering said device operative and inoperative at will.

Still another object is to provide a thrust measuring device of novel construction which can be readily attached and detached as a unit to and from a thrust bearing of standard construction as well as integrally embodied in a bearing as originally designed.

A still further object is to provide mechanism of this character wherein the deflection of a thrust receiving member under load is measured by means of the displacement of a lever which places itself tangent to the curve of said deflection.

Another object is to embody in thrust measuring apparatus novel mechanism for multiplying the relative movements of members subjected to said thrust so as to give a readable indication of the amounts of either the instantaneous or mean thrust exerted thereon, and, if desired, to record or otherwise indicate said amounts.

A further object is to provide mechanism especially, but not exclusively, adapted for use in thrust measuring devices, embodying a novel, self-contained arrangement of levers whereby the relative movements of two members may be multiplied and indicated on an enlarged scale.

Still another object is to provide new and improved mechanism for accurately measuring and indicating on a readable scale the net thrust exerted in either direction upon a thrust bearing, including either mechanically or fluid pressure actuated means, or both, for producing the indication.

A still further object is to provide a novel form of equalizing thrust bearing wherein common means are employed both for equalizing the thrusts upon the various thrust receiving members and for actuating mechanism for measuring and indicating the thrust exerted thereon.

These and other objects will appear more fully from a consideration of the detailed description of the invention which follows. Although several embodiments of the invention are described and illustrated in the accompanying drawings, it is to be expressly understood that these drawings are for the purpose of illustration only and are not to be construed as a limitation of the scope of the invention, reference being had for this purpose to the appended claims.

In the drawings, wherein like reference characters indicate like parts throughout the several views:

Fig. 3 is a sectional plan view taken substantially on a horizontal plane through the axis of the shaft but with certain parts shown in full and other parts broken away in the interest of clearness;

Fig. 4 is a fragmentary sectional plan view taken substantially on line 4—4 of Fig. 1 showing a modified form of fulcrum establishing means for the flexible indicating bar which may also be used for indicating the thrust by fluid pressure means;

Fig. 5 is a plan view of another embodiment of the invention illustrating a self-contained thrust equalizing and measuring device adapted for ready attachment to a thrust bearing, the top of the equalizing mechanism housing being removed;

Fig. 6 is an end view of the embodiment shown in Fig. 5;

Fig. 7 is a sectional view taken substantially on line 7—7 of Fig. 5 to show the thrust transmitting lever and associated parts in elevation;

Fig. 8 is a perspective assembly view of one form of mechanism for multiplying and indicating the relative movements of certain members of a thrust measuring device so as to give a readable indication of the amounts of said thrusts;

Fig. 9 is a separated view in perspective of certain of the parts of the mechanism shown in Fig. 8;

Fig. 10 is a sectional side elevation, with certain parts shown in full, of the embodiment of Fig. 8;

Fig. 11 is an end view of another embodiment of a thrust measuring mechanism;

Fig. 12 is a side elevation, with certain parts shown in section, on the line 12—12 of Fig. 11;

Fig. 13 is an end view of another embodiment of a thrust equalizing and measuring mechanism;

Fig. 14 is a sectional side view taken substantially on the line 14—14 of Fig. 13;

Figure 1:
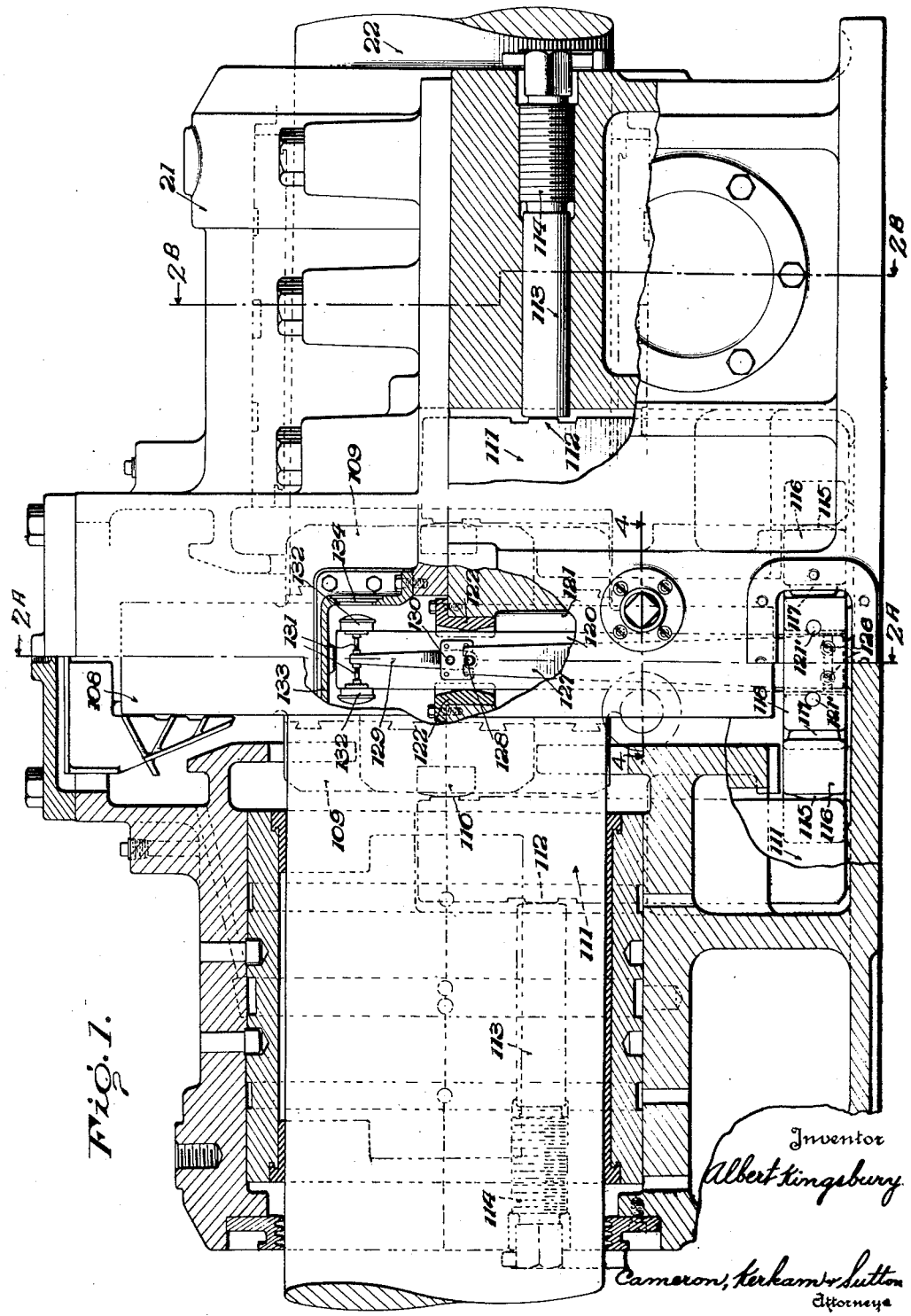
Fig. 1 is a side elevation, partly in section and with certain parts broken away to show details of construction lying in different vertical planes, of one practical form of thrust bearing embodying various features of the present invention.

Referring first to the embodiment of Figs. 5, 6 and 7, there is disclosed therein a novel, self-contained, thrust equalizing and measuring mechanism which may be attached and detached as a unit to and from a thrust bearing of standard construction as well as embodied integrally in a bearing as originally designed. The mechanism comprises an extremely simple arrangement of levers housed in a casing which may be readily secured to the housing of a standard thrust bearing, one of said levers being flexible in response to the amount of thrust exerted on the bearing and being provided with novel means for measuring and indicating the resultant amount of deflection. The type of mechanism shown is especially well adapted for use with thrust bearings of the well known Kingsbury type, and more particularly with bearings of this type for horizontal shafts wherein only two thrust receiving bearing members or shoes are utilized, one on each side of the shaft, but the invention is not limited to such uses.

In the embodiment illustrated, 21 indicates the housing of a thrust bearing for a horizontal shaft 22, the thrust bearing being of a known Kingsbury construction having a pair of opposite bearing shoes in thrust receiving engagement with a thrust collar formed or mounted on shaft 22, each bearing shoe being provided with a thrust pin, indicated at 23, which extends parallel to the shaft to the end of bearing housing 21 where it is normally provided with a jackscrew for adjusting purposes. Where the thrust equalizing and measuring mechanism of the present invention is to be used with such a bearing of the usual construction, the jackscrews are removed and a horseshoe-shaped casing or housing 24 is secured to the end of bearing housing 21 in any suitable manner, as by bolts or screws 25, with the contained mechanism in position to receive, equalize and measure the thrusts transmitted by pins 23.

As shown, housing 24 contains a pair of rigid, vertical, thrust transmitting lever members 26 and 27, located on opposite sides of shaft 22 in line with thrust pins 23, and a flexible horizontal equalizing and measuring lever 28, extending above and transverse to shaft 22. Each of lever members 26 and 27 is provided adjacent its lower end and in the outer face thereof with a suitable knife-edged insert 29 which engages a similar insert 30 in the wall of housing 24 and forms therewith a fulcrum for said lever member. Flexible lever 28 is supported in its horizontal position adjacent the top of housing 24 by a suitable pivot pin 31 secured to and depending downwardly from an overhanging portion 32 of housing 24, pivot pin 31 being located substantially in a vertical plane through the axis of shaft 22 and forming a fulcrum, both for bodily movement and flexure, for lever 28 at a point midway between its ends. Flexible lever 28 is also provided adjacent each end thereof with a suitable recess 33 in which there is mounted a knife-edged insert 34 adapted to engage one end of a thrust transmitting pin 35, the other end of which engages a similar insert 36 carried adjacent the upper end and in the outer face of one of rigid lever members 26, 27, the knife edges of inserts 36, however, being positioned at right angles to those of inserts 34. The thrusts from the bearing shoes are transmitted to lever members 26 and 27 at horizontally aligned points intermediate the ends and in the inner faces of said levers through the enlarged heads 37 of thrust pins 23 and knife-edged inserts 38 mounted in the inner faces of said lever members and in engagement with said enlarged heads. A separately removable cover 39 for housing 24 completes the thrust receiving and equalizing assembly.

With this construction, the various thrusts which are exerted upon the two bearing shoes are transmitted through thrust pins 23, enlarged heads 37 and knife-edged inserts 38 to their respective vertical lever members 26 and 27 which, in response to said thrusts, are urged about their fulcrum points 29, 30, and through the thrust transmitting agencies of pins 35 in turn tend to move lever 28 bodily about pivot pin 31 in response to said thrusts. Lever 28 thus receives simultaneously at its two ends the thrusts from the two bearing shoes and, if these thrusts are unequal, will tend to rotate about its pivot or fulcrum until the thrusts are equalized.

Moreover, by making lever 28 flexible so that it will be deflected about pivot pin 31 in response to the amount of the equalized thrust, an instrumentality is provided whereby the amount of thrust may be measured and indicated. For this purpose, there has been provided novel means for not only indicating, but also multiplying, the deflection of flexible lever 28 from its normal position as a measure of the equalized thrust exerted upon the bearing. As shown, a relatively light, rigid, elongated member 40, hereinafter referred to as a tangent lever, is secured at one of its ends in any suitable manner to one end of flexible lever 28, and extends to and beyond the opposite end of said flexible lever with its extremity projecting into a suitable indicator housing 41 which includes means of any desired character for indicating or recording movements of said tangent lever from its normal position.

Since tangent lever 40 is secured at one end only to one end of flexible lever 28 and is free to move at its opposite end, it will be seen that should lever 28 be deflected from its normal position under the equalized thrust load transmitted thereto, tangent lever 40 will tend to place itself tangent to the curve of such deflection and the movement of the free end of said tangent lever, either with respect to a fixed point within indicator housing 41 or with respect to the adjacent end of flexible lever 28, will be an amplified indication of the amount of the deflection of lever 28, and consequently of the thrust load on the bearing. For example, with a mechanism of the type disclosed, measuring between two points, one on the free end of tangent lever 40 and one on the adjacent end of flexible bar 28, the displacement obtained for a given thrust load will be about four times the deflection of lever 28 at one end.

In the embodiment illustrated, tangent lever 40 is given a slight V-shape in order to clear pivot pin 31 and the overhanging portion 32 of casing 24, but it will be understood that where construction permits, as if tangent lever 40 were secured underneath flexible lever 28, it may be straight from one end to the other. In this connection, as shown in Fig. 7, tangent lever 40 preferably has both an upper and a lower portion adjacent to the upper and lower surfaces of flexible lever 28, which construction is convenient for the mounting of a vertical index of any suitable character in indicator housing 41, or for connection to additional multiplying and indicating mechanism as later to be described in connection with Figs. 8, 9 and 10.

Should, for any reason, it be desired not to utilize the thrust equalizing and measuring mechanism thus described, means are provided for rendering said mechanism inoperative at will. In the form shown, this may be accomplished by means of adjustable stop screws 42, one of which is provided for each of rigid vertical lever members 26 and 27, threaded into housing 24 adjacent the top thereof and in the plane of its associated lever member. By adjusting stop screws 42 to their innermost positions into engagement with the outer faces of lever members 26 and 27, movement of said lever members about their pivots 29, 30 in response to the thrusts exerted upon the bearing shoes is prevented, thereby rendering flexible lever 28 inoperative for equalizing and thrust measuring purposes. If desired, stop screws 42 may be replaced by suitable fluid pressure actuated means, such as a diaphragm or piston which may be moved into engagement with the outer faces of rigid lever members 26 and 27 under the influence of fluid as shown at either end in Fig. 4 and hereinafter described. Such a construction might also be provided with suitable gauge or other indicating mechanism to serve for indicating or recording the thrust upon the corresponding shoes.

Referring now to Figs. 8, 9 and 10 there is disclosed therein a novel arrangement of levers and associated mechanism for indicating on an enlarged scale the relative movements of two movable members, such as tangent lever 40 and flexible lever 28 of the apparatus just described. Where mechanism of this character is employed for measuring and indicating the thrust on a propeller shaft on which the torque is constantly varying, it is also preferable to include means for damping the movements of these elements so as to provide a measurement of their mean displacement rather than the instantaneous values thereof.

In the form shown, the multiplying and indicating mechanism is compactly housed as a unit in a suitable casing 41 which may be detachably secured to thrust bearing housing 21 as indicated in Figs. 5 and 6. The free ends of the upper and lower portions of tangent lever 40 extend into casing 41 and are connected by a suitable crosstie 42 carrying a clamp 43 secured thereto in a position directly in line with a similar clamp 44 secured to the adjacent end of flexible lever 28. Clamp 44 grips one end of a suitable wire connecting member 45 which is surrounded by a rigid protecting tube 46 and is gripped at its opposite end by a clamp 47 secured to and carried by a swinging lever 48 adjacent the upper end thereof, said swinging lever being pivoted or fulcrumed at its lower end in a suitable bearing bracket 49 fixed to and projecting inwardly from the wall of casing 41. Swinging lever 48 will hence be oscillated about its pivot in bracket 49 in response to the movements of the end of flexible lever 28 as the latter is deflected from its normal position under the influence of the thrust loads exerted upon the bearing, and in response to the movements of said lever during equalization of the thrusts on the opposite shoes. In this connection, it will be observed that during bodily movement of lever 28 about its fulcrum for equalization purposes, there is no relative displacement of tangent lever 40 with respect thereto.

The upper end of swinging lever 48 is provided with a suitable yoke 50, the extremities of which provide a bearing for a three-armed lever of novel construction, indicated generally at 51. Three-armed lever 51 has a substantially vertical arm 52 to the upper end of which is secured one end of a flexible blade member 53, the other end of said blade member being secured to a yoke member 54 in the extremities of which is journalled, as by a pin 55 and ball bearing 56, a clamp 57 in which is gripped one end of a wire connecting member 58. The opposite end of wire connecting member 58 is gripped by clamp 43 operatively carried by tangent lever 40, and said connecting member is covered by a suitable protecting tube 59, a construction similar to that previously described as connecting the end of flexible lever 28 and the upper end of swinging lever 48. With this construction, the movements of tangent lever 40 will be resiliently transmitted through flexible blade member 53 to the upper end of arm 52 of three-armed lever 51, and thus tend to urge the latter about its pivot in yoke 50.

Three-armed lever 51 is also provided with a downwardly extending arm 60 to the lower end of which is secured an L-shaped pointer member 61, the extremity of the latter being adapted to register with a suitably graduated scale 62 carried by the lower end of a bracket 63 which is operatively connected for movement with swinging lever 48, in a manner later to be described. Housing or casing 41 is preferably provided with a suitable window opposite the positions of pointer member 61 and scale 62 through which the indications of said elements may be observed.

Three-armed lever 51 has a third arm 64, extending in a substantially horizontal plane and in the opposite direction to connecting members 45 and 58, which is secured by a suitable flexible joint 65 to the upper end of a piston rod 66 which extends downwardly into a dashpot cylinder 67 and terminates at its lower end in a dashpot piston 68. Dashpot cylinder 67 is suitably secured as by screws 69 to bracket arms 70 preferably formed integral with swinging lever 48, and is also secured to, or formed integrally with, bracket 63 previously referred to on which scale 62 is mounted. With this construction, the relative movements or vibrations of tangent lever 40 and flexible lever 28 under constantly varying thrust loads are damped sufficiently by the dashpot so that the readings of pointer member 61 on scale 62 indicate the mean or average thrust load exerted upon the bearing rather than the instantaneous values thereof. However, if it is desired that instantaneous values be indicated, it is only necessary to replace flexible blade member 53 by a rigid piece and to disconnect horizontal arm 64 from dashpot piston rod 66.

It is also contemplated that, within the scope of the present invention, indicator member 61 and scale 62 may be replaced by any other suitable indicating or recording mechanism.

In operation, when the thrusts from the bearing members of the thrust bearing are applied to flexible lever 28 so as to flex the same about its fulcrum, the right end thereof and the right end of tangent lever 40 will tend to separate, the end of flexible lever 28 moving to the left, as viewed in Fig. 8, and the end of tangent lever 40 to the right. The motion of the end of flexible lever 28 is transmitted through clamp 44, wire connecting member 45 and clamp 47 to the upper end of swinging lever 48, and tends to rotate the same in a counter-clockwise direction about its pivot in bearing bracket 49. Swinging lever 48 will carry with it three-arm lever 51 which is pivoted thereon, flexible blade member 53, dashpot cylinder and piston 67 and 68 and scale 62. At the same time, however, the motion of the end of tangent lever 40 is transmitted through clamp 43, wire connecting member 58 and clamp 57 to the lower end of flexible blade member 53. This motion would normally tend to rotate the three-armed lever 51 about its pivot in yoke 50 in a counter-clockwise direction. However, dashpot piston and cylinder 67 and 68 act to oppose any rotation of three-armed lever 51, and the movement of the end of tangent lever 40 therefore acts primarily to flex flexible blade member 53 by moving its lower end to the right, as viewed in Fig. 8. Flexible blade member 53, being thus flexed, tends to straighten out and thereby to urge three-armed lever 51 about its pivot in yoke 50 in a counter-clockwise direction, which rotation carries pointer member 61 to the right so as to indicate the correct reading on scale 62. The force of flexible blade member 53 is continually damped by the action of dashpot cylinder and piston 67 and 68 so that pointer 61 registers the mean thrust rather than the instantaneous value thereof. However, as pointed out above, if it is desired to indicate the instantaneous thrust load, flexible blade member 53 may be replaced by a rigid piece, and horizontal arm 64 of three-armed lever 51 may be disconnected from dashpot piston rod 66 so that pointer member 61 will follow every movement of tangent lever 40.

There is disclosed in Figs. 11 and 12 another embodiment of thrust measuring and indicating mechanism according to the present invention which is especially well adapted for use with thrust bearings wherein it is not desired to equalize the thrusts on the shoes on opposite sides of the shaft and yet a measurement is required of the average or mean thrust applied to the various shoes. As shown therein, there is threaded into the end of the thrust bearing housing 21 for shaft 22 two pairs of stud members 71, each pair having an upper and lower stud, on which are provided suitable means for establishing fulcrum points for a pair of flexible or elastic, vertically disposed bar members 72 and 73, each of which is adapted to receive at a point intermediate its fulcrumed ends the thrust load from one of the thrust bearing shoes. In the embodiment shown, each of vertical flexible bar members 72 and 73 is provided with suitable openings 74 adjacent both the upper and lower ends thereof through which stud members 71 freely pass. The outer ends of openings 74 are enlarged to receive cylindrical sleeves 75 which are freely mounted on stud members 71 and engage at their inner faces knife-edged inserts 76 mounted in the bases of said recesses, said knife edges forming the fulcrum points for flexible bar members 72 and 73. Sleeves 75 and members 72 and 73 are held against outward movement on stud members 71 by suitable lock nuts 77.

In order to transmit the thrusts from the respective bearing shoes to flexible bar members 72 and 73 at points intermediate the upper and lower ends thereof, the usual jackscrews for main thrust pins 78 are removed and replaced by threaded bushings 79 in which are slidably supported auxiliary thrust pins 80 having enlarged heads 81 normally in thrust transmitting engagement with knife-edged inserts 82 mounted in the inner faces of flexible bar members 72 and 73 intermediate the ends thereof. In the absence of the thrust measuring device each thrust pin 78 would be supported on the end of its corresponding bushing 79, but when nuts 77 are advanced so that the corresponding bar member 72 or 73, through the action of its knife edge 82 on head 81, forces the corresponding thrust pin 80 in an inward direction to project its inner end beyond the inner end of bushing 79, each thrust pin 78 transmits its thrust through pin 80 to the corresponding bar member 72 or 73. With this construction, it is evident that the individual thrust loads on each of the bearing shoes are transmitted to the associated flexible bar members 72 and 73, the deflection of each from its normal position thereby being proportionate to the thrust exerted upon the corresponding bearing shoe.

Suitable means are now provided for averaging and measuring the deflections thus produced in flexible bar members 72 and 73, and for indicating the net result as a measure of the mean thrust load exerted upon the bearing. As shown, each flexible bar member 72, 73 has secured thereto at its lower end one end of a tangent lever 83 or 84 which extends parallel to and adjacent the side of its associated flexible bar member to and beyond the upper end thereof, somewhat similar to the tangent lever construction previously described in connection with Figs. 5 and 6.

Since, if the thrust loads on the two bearing shoes, and consequently the deflections of the corresponding flexible bar members 72 and 73, are unequal, the displacements of the upper ends of tangent levers 83, 84 with respect to the adjacent ends of their corresponding bar members 72, 73 will also be unequal, means are provided to average these deflections, and thus obtain an indication of the mean thrust load. To this end the upper ends of flexible bar members 72, 73 are connected by a suitable transverse tie member 85 having suitable openings 86 therein through which the upper ends of tangent levers 83, 84 project. Transverse tie member 85 carries at its mid-point a suitable casing or housing 87 containing the indicating mechanism which may be of any suitable construction. The free upper ends of tangent levers 83, 84 are likewise connected by a tie rod 88 which passes through the housing 87 of the indicating mechanism and is provided with a suitable pointer or other device within said housing for producing an indication of the average displacements of tangent levers 83, 84 with respect to flexible bar members 72, 73. With this construction, transverse tie member 86 averages the deflections of flexible bar members 72 and 73, while tie rod 88 performs the same function for tangent levers 83 and 84, and, since the indicating mechanism contained in housing 87 is located at the mid-points of both transverse tie member 85 and tie rod 88, the indications recorded will be a measure of the average thrust applied to the various shoes of the bearing.

Figure 15:
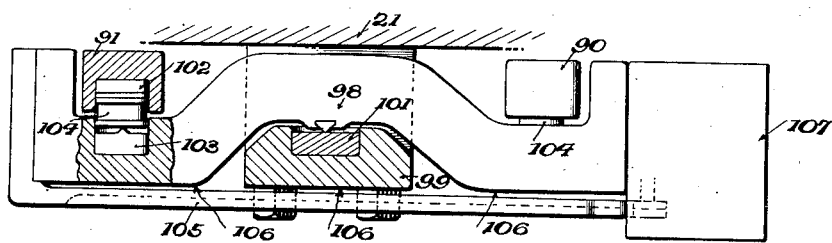
Fig. 15 is a sectional horizontal view, with certain parts shown in full, of a portion of the embodiment of Figs. 13 and 14 taken substantially on the line 15—15 of Fig. 13.

In Figs. 13, 14 and 15 there is disclosed a two-shoe thrust bearing which is provided with equalizing and thrust measuring mechanism combining the features of the two embodiments previously described in Figs. 5 and 6, and in Figs. 11 and 12. In this embodiment, as in Figs. 11 and 12, the usual jackscrews for main thrust pins 78 are removed and replaced by threaded bushings 79 in which are slidably supported auxiliary thrust pins 80 having enlarged heads 81 normally in thrust transmitting engagement with knife-edged inserts 89 adjustably mounted in the inner faces of a pair of rigid vertical lever members 90 and 91 intermediate the ends thereof. Each of lever members 90, 91 is provided with an adjusting screw 92 engaging insert 89 by means of which the position of the bearing shoes and the other elements of the thrust equalizing and measuring mechanism may be adjusted.

Rigid lever members 90 and 91 are supported at their upper ends on stud members 93 which pass freely through the upper ends thereof and are threaded into the end of bearing housing 21. Stud members 93 also have freely mounted thereon cylindrical sleeves 94 which fit into recesses 95 in rigid lever members 90 and 91 and engage at their inner faces knife-edged inserts 96 mounted in the bases of said recesses. Sleeves 94 and lever members 90 and 91 are held against outward movement on stud members 93 by suitable lock nuts 97. Below and extending transversely to shaft 22 is mounted a flexible horizontal lever 98 in position to receive and equalize the thrusts from the lower ends of rigid lever members 90 and 91, and also to indicate by the amount of its deflection under the equalized thrusts the mean thrust load exerted upon the two shoes of the bearing. Flexible lever 98 is supported at its middle portion by a suitable yoke member 99 which may be secured to the thrust bearing housing 21 in any desired manner, as by bolts or screws 100, and is fulcrumed at its mid-point by a knife-edged insert 101, the edge of which lies substantially in a vertical plane through the axis of shaft 22. The thrusts are transmitted from the lower ends of rigid vertical lever members 90 and 91 to the outer ends of flexible lever 98 through knife-edged inserts 102 and 103, mounted in the vertical levers and the horizontal flexible lever, respectively, and thrust transmitting pins 104 interposed between said inserts, a construction similar to that previously described in connection with the embodiments of Figs. 5 and 6.

In order to indicate the amount of deflection of flexible bar 98 from its normal position which is a measure of the mean thrust exerted on the shoes of the bearing if the deflection at either end of said bar is taken, since said bar equalizes the pressure on the shoes, and which is a measure of the total thrust on the bearing if the deflection at both ends of the bar is summated, there is secured to one end of said flexible lever one end of a tangent lever 105, similar in construction to those described in connection with the preceding embodiments. Since the deflection of flexible lever 98 will be outward with respect to the thrust bearing housing, and since the movement of the free end of tangent lever 105, in its effort to place itself tangent to the curve of deflection, will consequently be inward toward said bearing housing, the space indicated at 106 in Fig. 15 must be made such that movement of tangent lever 105 under the maximum thrust load expected will not be so great as to bring said tangent lever into contact with flexible lever 98 or yoke member 99. The free end of tangent lever 105 may be connected to any desired form of indicating mechanism contained in a suitable casing or housing indicated generally at 107, said housing being carried by flexible lever 98.

It will be understood that the indicating mechanism contained in housing 107, and also in housing 87 of Figs. 11 and 12, may be similar to that disclosed in Figs. 8, 9 and 10, or may comprise a simple pointer and scale mechanism without additional multiplication devices.

The general mode of operation of this embodiment is similar to that described above in connection with Figs. 5 and 6. Should it be desired to render the thrust equalizing and measuring mechanism inoperative, this may be done by threading bushings 79 inwardly until their inner ends abut the outer ends of main thrust pins 78, thereby removing all thrust from vertical lever members 90 and 91. Bushings 79 will also act as bumpers in case there should be any breakage of the equalizing and measuring mechanism.

Figure 2:
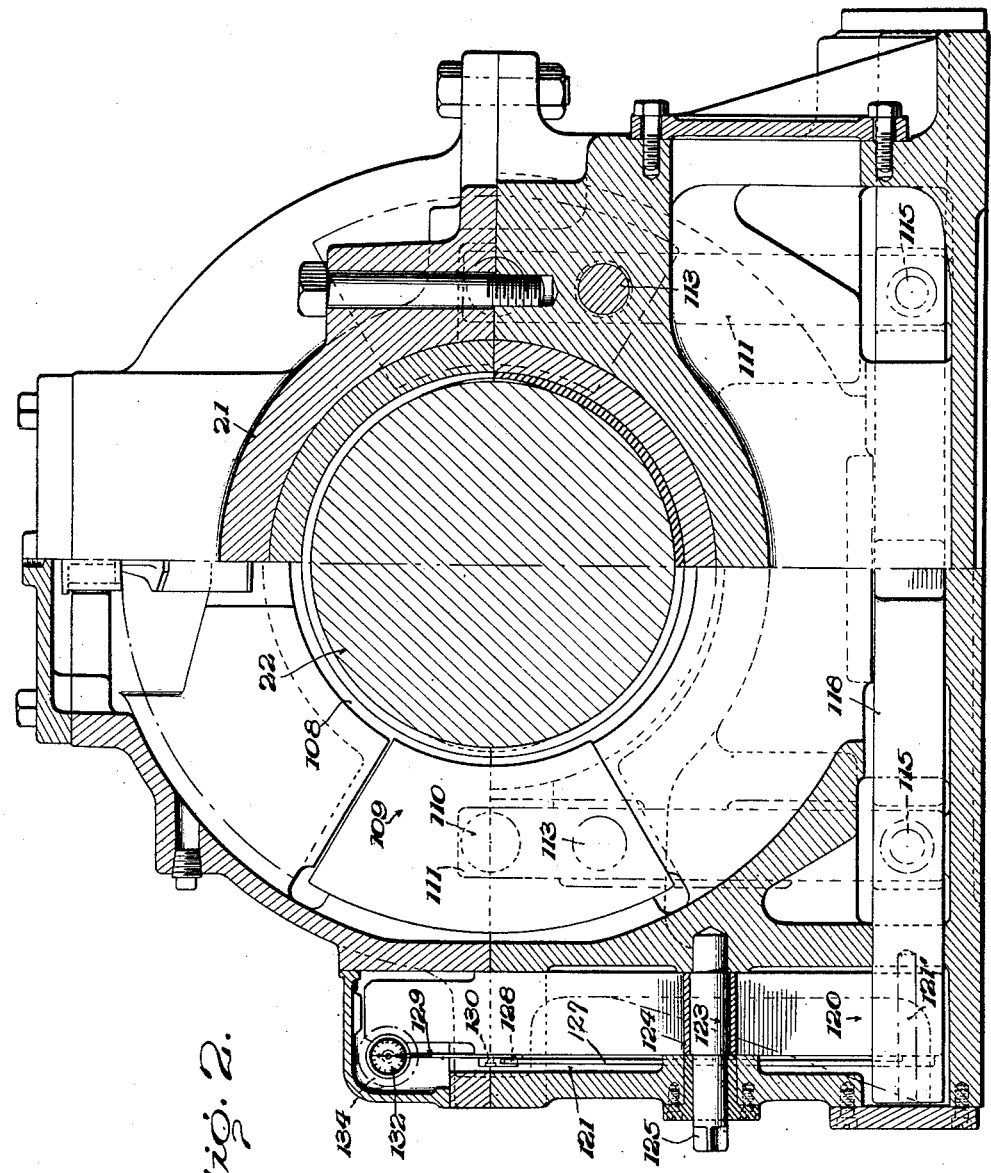
Fig. 2 is a composite cross-sectional view of the embodiment shown in Fig. 1, the left half being taken substantially on the line 2A—2A of Fig. 1, while the right half is taken substantially on the line 2B—2B of Fig. 1, certain parts being omitted and others shown in full for the sake of clearness.

Referring now to Figs. 1, 2 and 3, there is disclosed therein a practical commercial form of thrust bearing for a horizontal shaft capable of rotation in both directions embodying both means for equalizing the thrusts upon the shoes on each side of the thrust collar and means for measuring and indicating the direction and amount of the net thrust applied to the thrust bearing, including the flexible bar and tangent lever combinations described in the preceding embodiments.

As shown, a horizontal shaft 22 which may be rotated in either direction is provided with a suitable thrust collar 108 which is adapted to transmit the thrust upon shaft 22 to a plurality of thrust receiving bearing members or shoes 109 here shown as of the well known Kingsbury type, which are supported in and ultimately transmit the thrust thus received to a bearing housing 21. The bearing illustrated is of the two-shoe type wherein the pivot inserts 110 of the two shoes 109 on each side of thrust collar 108 lie in a substantially horizontal plane through or adjacent to the axis of shaft 22. Since this bearing is double ended so as to take the thrust in either direction of rotation of shaft 22, the thrust receiving mechanism is symmetrical with respect to a plane through the center of thrust collar 108 perpendicular to the axis of shaft 22.

The pivot insert 110 of each of bearing shoes 109 engages the inner face of the upper end of a rigid vertical thrust transmitting lever 111 which rests upon the bottom of housing 21 and is fulcrumed, as at 112, at a point on the outer face thereof intermediate the upper and lower ends, by means of a thrust pin 113 and jackscrew 114. Since jackscrews 114 are adjustably threaded into bearing housing 21, this arrangement of elements provides not only fulcrums for vertical levers 111 but also means for adjusting the position of bearing shoes 109 with respect to thrust collar 108.

At its lower end each vertical lever 111 is in engagement at its inner face with a suitable pivot insert 115 carried by one end of a rigid equalizing lever 116 which extends transversely to and beneath shaft 22 and is fulcrumed at its mid-point by a pivot insert 117 which lies substantially in a vertical plane through the axis of said shaft. The thrusts upon the two shoes of each pair on each side of thrust collar 108 are equalized by equalizing lever 116 in a manner similar to that previously described in connection with the preceding embodiments.

The pivot inserts 117 forming the fulcrum points of the two equalizing levers 116 rest against the opposite sides of a rigid bar member 118 which extends transversely to and beneath the axis of shaft 22 and is supported in the bottom of housing 21 or on projections extending upwardly therefrom (Fig. 2) so as to be bodily movable laterally in response to the thrusts applied thereto through pivot members 117. The normal noload position of transverse bar member 118 is substantially in the vertical plane of thrust collar 108, and since the equalized thrusts from the pairs of shoes on both sides of collar 108 are transmitted to the opposite sides of said bar member, the lateral bodily displacement of said member from its normal no-load position will be in proportion to the net thrust load applied to the bearing.

In order that the net thrust load may be measured and visually indicated, suitable means have been provided for transmitting and multiplying to an easily perceptible degree the lateral bodily movements of bar member 118. As shown, one end of said bar member is provided with a suitable recess 119 into which extends the lower end of a vertical flexible measuring lever or bar 120 which is housed in a cored well 121 formed centrally in one side of housing 21. This lower end of flexible measuring bar 120 may be made substantially rigid with transverse bar member 118 as by suitable binding screws indicated at 121'. Flexible bar 120 extends vertically upward from transverse bar member 118 and, adjacent its upper end, passes between two fixed fulcrum blocks 122 having bevelled or knife-edged bearing surfaces which while preventing lateral bodily movement of flexible bar 120 yet permit flexure thereof.

Intermediate the lower end of flexible bar 120 and fixed fulcrum members 122, there are provided means for establishing a fixed fulcrum on either or both sides of said flexible bar at the will of the operator. In the form shown in Figs. 1 and 2, these fulcrum means comprise a pair of eccentric stub shafts 123 suitably journalled in bearing housing 21, one on each side of flexible bar 120, and each provided with a roller 124 therearound and a squared end 125 projecting outwardly of said housing. When either of eccentric shafts 123 is rotated by means of its squared end 125 so as to bring the outwardly eccentric side into engagement with the side of flexible bar 120, a fixed fulcrum will be provided for said bar at that point.

It will be evident that with this construction any lateral bodily movement of transverse bar member 118 will be transferred to the lower end of flexible bar 120 and, if the proper eccentric shaft 123 has been rotated to fulcrum-forming position, flexible bar 120 will be deflected from its normal vertical position to an amount proportionate in direction and extent to the net thrust applied to the bearing.

In order that the deflections of flexible bar 120 may be indicated as a measure of the net thrust being applied, suitable means are provided for multiplying and visually indicating on a readable scale the deflections of said bar. As shown, there is secured to the lower end of flexible bar 120, by screws 126, the lower end of a tangent lever 127 the upper end of which terminates adjacent fixed fulcrum blocks 122 and there engages, by a suitable pin and slot connection indicated at 128, the lower end of a lever 129 pivotally mounted on flexible bar 120, as at 130. The upper end of lever 129 is in actuating engagement with the stems 131 of a pair of dial indicators 132 of any suitable construction, which indicators are mounted on the sides of flexible bar 120. Dependent upon the direction of the net thrust exerted on the bearing, tangent lever 127, in its tendency to place itself tangent to the curve of deflection of flexible bar 120, will be displaced to one side or the other with respect to its normal vertical position, and one or the other of dial indicators 132 will be actuated by the upper end of lever 129 to indicate on a readable scale the amount of the net thrust then being applied to the bearing. Cored well 121 in which this indicating mechanism is housed may be provided with a suitable removable cover 133 having windows 134 through which the readings of indicators 132 may be observed. The dials of indicators 132 are preferably calibrated in terms of net thrust load.

Figure 16:
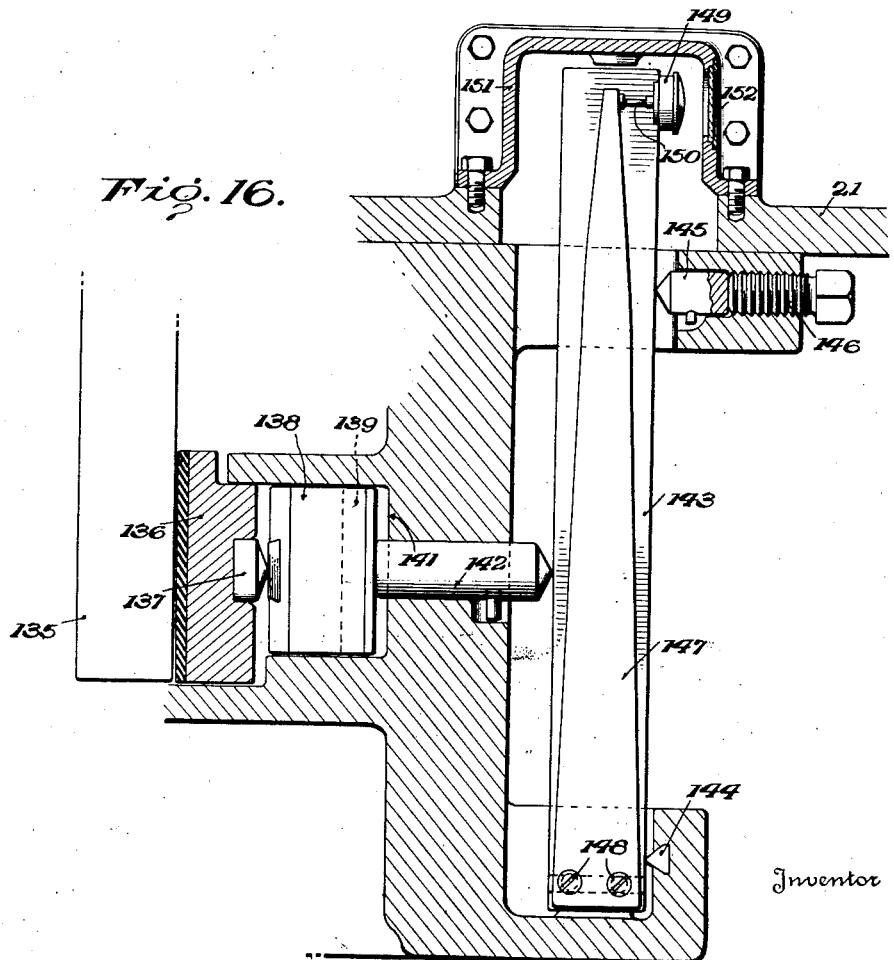
Fig. 16 is a sectional side view, with certain parts shown in full, of one embodiment of the invention as applied to a leveling plate bearing.

Still another adaptation of the present invention is disclosed in Fig. 16 wherein is illustrated a portion of a thrust bearing of the well known Kingsbury levelling plate type. In bearings of this type, the thrust on the shaft is transmitted through a thrust collar 135 to a plurality of bearing shoes 136 circumferentially spaced with respect to said collar. Each bearing shoe 136 in turn transmits its thrust through a suitable pivot insert 137 to substantially the midpoint of a levelling plate 138. Each levelling plate 138 in turn rests at its ends upon two levelling plates 139 normally in thrust transmitting contact with a thrust receiving surface 141 in the thrust bearing housing, as shown for example in my Patent No. 1,428,640 of September 12, 1922.

In adapting such a levelling plate bearing to the measurement of the thrust load in accordance with the present invention, one of the levelling plates 139 has associated therewith a thrust transmitting pin 142 extending through the thrust bearing housing and into engagement with one side of a flexible bar member 143 at a point intermediate the ends of the latter. Flexible bar member 143 is provided, at its lower end and on its side opposite to that engaged by pin 142, with a fixed fulcrum 144 mounted in the thrust bearing housing and, at a point intermediate its opposite end and the line of thrust from pin 142, with an adjustable fulcrum shown as a suitable pointed member 145 adjustable by means of jackscrew 146 threaded into the bearing housing. With this construction, jackscrew 146 may be threaded inwardly until pointed fulcrum member 145 moves flexible bar member 143 to the left to the position shown in Fig. 16 and in so moving forces pin 142 to engage levelling plate 139 and move it to the left a sufficient distance to lift it out of thrust engagement with surface 141. With the elements in this position, if a thrust load is applied to the shaft there will be transmitted from thrust collar 135 directly to flexible bar 143 a fraction of the thrust load equal to the thrust load divided by the number of shoes engaging the face of the thrust collar, and since said bar 143 is fulcrumed at its lower end and at a point adjacent its upper end, the deflection from the normal will be a measure of the thrust being applied to each bearing shoe 136.

In order that the amount of the deflection of flexible bar 143 may be suitably amplified and indicated upon a readable scale, flexible bar 143 may be provided with a tangent lever 147, secured thereto at its lower end as by screws 148, the upper end of which is free to move relatively to flexible bar 143 so that as the latter is deflected under the thrust load, the tangent lever 147 tends to place itself parallel to the curve of said deflection in the manner described in connection with the preceding embodiments. In order that the amount of relative movement of the free end of tangent lever 147 and the adjacent end of flexible bar 143 may be suitably recorded, the upper end of said bar adjacent the free end of the tangent lever is provided with a suitable dial indicator 149 having an actuating stem 150 which is in engagement with the side of tangent lever 147. A suitable removable cover 151 may be provided to enclose the top of this measuring mechanism having a suitable window 152 through which the dial of indicator 149 may be observed.

If it is desired to render the thrust measuring mechanism inoperative, it is only necessary to back off on fulcrum screw 146 until flexible bar 143 moves far enough to the right, as viewed in Fig. 16, so that the levelling plate 139 is again in thrust transmitting engagement with surface 141.

There is also disclosed in Fig. 4 a fragmentary sectional view of a modified form of fulcrum establishing means which may be utilized, for example, in the embodiment shown in Figs. 1, 2 and 3 in place of the eccentric shaft and roller arrangement therein illustrated. This embodiment utilizes fluid pressure and is capable of indicating net thrust. As shown in Fig. 4, the eccentric stub shafts 123 and rollers 124 of Figs. 1, 2 and 3 are removed and replaced by a pair of pistons 170 located in cylinders 171 on opposite sides of flexible bar member 120. The outer end of each of cylinders 171 is closed by a suitable plug 172 to which is connected a tube or pipe 173 leading from a suitable source of fluid pressure supply 174. With this construction, when it is desired to form a fulcrum on either side of flexible bar 120, fluid is forced into the cylinder 171 on the proper side of bar member 120 so that its piston 170 is in turn forced into engagement with the side of said bar. If a suitable pressure responsive gauge such as diagrammatically indicated at 175 is inserted in pipe line 173, it will be evident that after piston 170 has been moved into fulcruming engagement with the side of flexible bar 120, the variations in the pressure produced on the fluid by the contact of bar 120 with piston 170 will be a measure of the net thrust being exerted upon the thrust bearing. This fluid pressure actuated indicating mechanism may be used either independently of or in conjunction with the mechanical indicating mechanism utilizing a tangent lever, such as disclosed in Figs. 1, 2 and 3.

There is thus provided by the present invention a constructionally simple mechanism for accurately measuring and indicating the amount of thrust exerted upon a thrust bearing, which mechanism may be readily attached and detached as a unit to and from a thrust bearing of standard construction as well as integrally embodied in a bearing as originally designed. This novel apparatus includes the provision of one or more flexible members which are subjected to and deflected by the thrust applied to the bearing, and means for measuring the amount of the deflection and indicating the same upon a readable scale as a measure of the thrust being exerted. Novel means have also been provided for multiplying and indicating the relative movements of two members the displacements of which are proportionate to the thrust exerted upon a thrust bearing, said mechanism including a self-contained arrangement of levers of novel construction. The present invention also provides new and improved mechanism for accurately measuring and indicating net thrusts, which mechanism may employ either mechanically or fluid-pressure actuated means, or both, for producing the indications of the thrust.

It will be obvious that the invention is not limited to the forms shown in the drawings, but is capable of a variety of mechanical embodiments. For example, any suitable type of scale indicator may be substituted for the forms shown and described, and other mechanism may be used if desired with or in place of the indicating mechanism, and other forms of force transmitting mechanisms may be substituted for the specific lever arrangements illustrated. Also, although the invention has been described with particular reference to bearings of the Kingsbury type, it will be understood that it is not limited to this or any other specific type of bearing but is capable of a variety of different applications. Furthermore, many of the various features described may be used separately or in combination with other features within the scope of the invention. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:—

1. In a thrust bearing of the type embodying a plurality of thrust receiving bearing members, means for measuring the thrust on said bearing comprising an elongated flexible bar, means for retaining one portion of said bar against movement, means for transmitting thrust from different bearing members to different portions of said bar to bend said bar, and a member for magnifying and indicating the amount of deflection of said bar from the normal as a measure of said thrust.

2. In a thrust bearing of the type embodying a plurality of thrust receiving bearing members, means for measuring the thrust on said bearing comprising a flexible bar fulcrumed substantially at its mid-point, means for transmitting the thrust on said bearing members to points on said bar on opposite sides of said fulcrum, and means for indicating the amount of deflection of the portions of said bar on the opposite sides of said fulcrum from the normal as a measure of said thrust.

3. In a thrust bearing of the type embodying a plurality of thrust receiving bearing members, means for measuring the thrust on said bearing comprising a flexible bar, means for transmitting the thrust on said bearing members to said bar including a plurality of rigid levers having fulcrum points fixed with respect to the housing of said bearing, and means for indicating the amount of deflection of said bar from the normal as a measure of said thrust.

4. In a thrust bearing of the type embodying a plurality of thrust receiving bearing members, means for measuring the thrust on said bearing comprising a flexible bar fulcrumed substantially at its mid-point, means including a plurality of rigid levers having fixed fulcrum points for transmitting the thrust on said bearing members to opposite ends of said bar, and means for indicating the amount of deflection of said bar from the normal as a measure of said thrust.

5. In a thrust bearing of the type embodying a plurality of thrust receiving bearing members, means for measuring the thrust on said bearing comprising a flexible bar, means for transmitting thrust from different bearing members to different portions of said bar to bend said bar, means for magnifying and indicating the amount of deflection of said bar from the normal as a measure of said thrust, and means for relieving said bar of the thrust of said members at will.

6. In a thrust bearing of the type embodying thrust receiving bearing means, means for measuring the thrust on said bearing including an elongated flexible bar having spaced fulcrum points, means for transmitting the thrust from said bearing means to a point on said bar intermediate said fulcrum points to bend said bar, and means attached to said bar but unflexed by said thrust for indicating the slope of curvature of said bar as a measure of said thrust.

7. In a thrust bearing of the type embodying a plurality of thrust receiving bearing members, means for measuring the thrust on said bearing comprising a flexible bar, means for transmitting the thrust on said bearing members to said bar including a plurality of rigid levers having fulcrum points fixed with respect to the housing of said bearing, means for indicating the amount of deflection of said bar from the normal as a measure of said thrust, and means for relieving said bar of the thrust of said bearing members at will including means adjustable to engage said rigid levers and prevent movement thereof about their fulcrum points.

8. In a thrust bearing of the type embodying a plurality of thrust receiving bearing members, means for measuring the thrust on said bearing comprising a flexible bar fulcrumed substantially at its mid-point, means including a plurality of rigid levers having fixed fulcrum points for transmitting the thrust on said bearing members to opposite ends of said bar, means for indicating the amount of deflection of said bar from the normal as a measure of said thrust, and means for rendering said thrust measuring means inoperative at will.

9. In a thrust bearing of the type embodying a plurality of thrust receiving bearing members, means for measuring the thrust on said bearing comprising a flexible bar having its longitudinal axis in a plane perpendicular to the axis of said bearing and having a fulcrum point fixed with respect to the housing of said bearing, means for transmitting the thrust from different bearing members which are opposite one another with respect to a plane including the axis of said bearing to different portions of said flexible bar so as to cause a deflection thereof about its fulcrum point, and means for indicating the amount of said deflection as a measure of said thrust.

10. In a thrust bearing of the type embodying a plurality of thrust receiving bearing members, means for measuring the thrust on said bearing comprising a flexible bar having its longitudinal axis in a plane perpendicular to the axis of said bearing and having a fulcrum point fixed with respect to the housing of said bearing, a pair of rigid levers perpendicular to said bar and engaging the same at points on opposite sides of the fulcrum point thereof, said levers also having fixed fulcrum points, means for transmitting the thrust from said bearing members to said rigid levers whereby there is caused a deflection of said bar about its fulcrum point, and means for indicating the amount of said deflection as a measure of said thrust.

11. In a thrust bearing of the type embodying a plurality of thrust receiving bearing members, means for measuring the thrust on said bearing comprising a flexible bar having a fulcrum point fixed with respect to the housing of said bearing, a pair of rigid levers engaging said bar at points on opposite sides of the fulcrum thereof, said levers also having fixed fulcrum points, means for transmitting the thrust from said bearing members to said rigid levers whereby there is caused a deflection of said bar about its fulcrum point, means for indicating the amount of said deflection as a measure of said thrust, and means for relieving said bar of said thrust including adjustable means for engaging said rigid levers and preventing movement thereof about their fulcrum points.

12. In a thrust bearing of the type embodying a plurality of thrust receiving bearing members, means for measuring the thrust on said bearing comprising a flexible bar having its longitudinal axis in a plane perpendicular to the axis of said bearing and having a fulcrum point fixed with respect to the housing of said bearing, means for transmitting to said bar the thrust from said bearing members so as to cause a deflection thereof about its fulcrum point including a pair of rigid levers perpendicular to said bar and engaging the same at points on opposite sides of the fulcrum point thereof, said levers also having fixed fulcrum points and points whereat is applied the thrust on said bearing members, means for indicating the amount of deflection of said bar as a measure of said thrust, and means for relieving said bar of said thrust including adjustable set screws threaded into the housing of said bearing and adapted to be engaged with said rigid levers for preventing movement thereof about their fulcrum points.

13. In a thrust bearing, means for measuring the thrust on said bearing comprising a flexible bar having a fulcrum point fixed with respect to the housing of said bearing, means for transmitting thrust to said bar so as to cause a deflection thereof about its fulcrum point, a tangent lever fixed at one end to said flexible bar and free at the other end whereby it tends to place itself tangent to the curve of deflection of said bar, and means for indicating the amount of relative displacement between the free end of said tangent lever and said bar as a measure of said thrust.

14. In a thrust bearing, means for measuring the thrust on said bearing comprising a flexible bar having a fulcrum point fixed with respect to the housing of said bearing, means for transmitting thrust to said bar so as to cause a deflection thereof about its fulcrum point, and means for indicating on an enlarged scale the amount of deflection of said bar from the normal as a measure of said thrust, including a tangent lever fixed at one end to said flexible bar and free at the other end whereby it tends to place itself tangent to the curve of deflection of said bar, and means for magnifying the relative movements of said bar and the free end of said tangent lever.

15. In a thrust bearing, means for measuring the thrust on said bearing comprising a flexible bar having a fulcrum point fixed with respect to the housing of said bearing, means for transmitting thrust to said bar so as to cause a deflection thereof about its fulcrum point, and means for indicating on an enlarged scale the amount of deflection of said bar from the normal as a measure of said thrust, including a tangent lever fixed at one end to said flexible bar and free at the other end whereby it tends to place itself tangent to the curve of deflection of said bar, means for magnifying the relative movements of said bar and the free end of said tangent lever, and means for damping the movements of said magnifying means so that said indicating means record the amount of mean thrust rather than the instantaneous values thereof.

16. In a thrust bearing, means for measuring the thrust on said bearing comprising a flexible bar having a fixed fulcrum point, means for transmitting thrust to said bar so as to cause a deflection thereof about its fulcrum point, a tangent lever fixed at one end to said flexible bar and free at the other end whereby it tends to place itself tangent to the curve of deflection of said bar, and means respectively actuated by the relative movements of the free end of said tangent lever and of the end of said bar adjacent said free end of the tangent lever for indicating on an enlarged scale the amount of said deflection as a measure of said thrust.

17. In a thrust bearing of the type embodying thrust receiving bearing members, means for measuring the thrust on said bearing including an elongated flexible bar having spaced fulcrum points, means for transmitting the thrust from said bearing members to a point on said bar intermediate said fulcrum points to bend said bar, a tangent lever fixed at one end to said flexible bar and free at its other end, and means for indicating the amount of displacement between the free end of said tangent lever and the corresponding end of said flexible bar as a measure of said thrust.

18. In apparatus of the character described, means for indicating on an enlarged scale the relative movements of two movable members comprising a swinging lever having a fixed pivot and carrying a scale, a second lever pivotally mounted on said swinging lever and carrying a pointer adapted to register with said scale, means for moving said swinging lever in accordance with the movements of one of said movable members, and means including a resilient connection for moving said second lever in accordance with the movements of the other of said members.

19. In apparatus of the character described, means for indicating on an enlarged scale the relative movements of two movable members comprising a swinging lever having a fixed pivot and carrying a scale, a second lever pivotally mounted on said swinging lever and carrying a pointer adapted to register with said scale, means for moving said swinging lever in accordance with the movements of one of said movable members, means for moving said second lever in accordance with the movements of the other of said members, and a dashpot having its members respectively connected to said levers for damping the movements of said second lever.

20. In apparatus of the character described, means for indicating on an enlarged scale the relative movements of two movable members comprising a swinging lever having a fixed pivot and carrying a scale, means for oscillating said lever about its pivot in accordance with the movements of one of said movable members, a second lever pivotally mounted on said swinging lever and carrying a pointer adapted to register with said scale, and means including a flexible blade member for connecting said second lever with the other of said movable members whereby the movements of the latter are resiliently transmitted to said second lever.

21. In apparatus of the character described, means for indicating on an enlarged scale the relative movements of two movable members comprising a swinging lever having a fixed pivot and carrying a scale, means for oscillating said lever about its pivot in accordance with the movements of one of said movable members, a second lever pivotally mounted on said swinging lever and carrying a pointer adapted to register with said scale, means including a flexible blade member for connecting said second lever with the other of said movable members whereby the movements of the latter are resiliently transmitted to said second lever, and means for damping the movements of said second lever produced by said connecting means.

22. In apparatus of the character described, means for indicating on an enlarged scale the relative movements of two movable members comprising a swinging lever having a fixed pivot and carrying a scale, means for oscillating said lever about its pivot in accordance with the movements of one of said movable members, a second lever pivotally mounted on said swinging lever and carrying a pointer adapted to register with said scale, means including a flexible blade member for connecting said second lever with the other of said movable members whereby the movements of the latter are resiliently transmitted to said second lever, and means for damping the movements of said second lever produced by said connecting means including a dashpot carried by said swinging lever and a dashpot piston operatively connected to said second lever.

23. In apparatus of the character described, means for indicating on an enlarged scale the relative movements of two movable members comprising a swinging lever having a fixed pivot, a three-armed lever pivotally supported on the swinging end of said swinging lever, a resilient blade member secured at one end to one of said arms and at the other end to one of said movable members whereby movement of the latter tends to oscillate said three-armed lever about its pivot, means connecting said swinging lever to the other of said movable members, means for damping the movement of said three-armed lever about its pivot including a dashpot carried by said swinging lever and a dashpot piston connected to the second arm of said three-armed lever, a scale carried by said swinging lever, and a pointer carried by the third arm of said three-armed lever and adapted to cooperate with said scale to give an indication of the amount of relative movement between said two movable members.

24. In a thrust bearing, means for measuring the thrust on said bearing comprising a flexible bar having a fulcrum point fixed with respect to the housing of said bearing, means for transmitting thrust to said bar so as to cause a deflection thereof about its fulcrum point, a tangent lever fixed at one end to said flexible bar and free at the other end whereby it tends to place itself tangent to the curve of deflection of said bar, and means for indicating on an enlarged scale the relative movements of the free end of said tangent lever and the adjacent end of said bar including an oscillatable member having a fixed pivot and carrying a scale, a second oscillatable member pivotally mounted on said first named member and carrying a pointer adapted to register with said scale, and means for moving said oscillatable members relatively to one another in accordance with the relative movements of the free end of said tangent lever and the adjacent end of said bar.

25. In a thrust bearing, means for measuring the thrust on said bearing comprising a flexible bar having a fulcrum point fixed with respect to the housing of said bearing, means for transmitting thrust to said bar so as to cause a deflection thereof about its fulcrum point, a tangent lever fixed at one end to said flexible bar and free at the other end whereby it tends to place itself tangent to the curve of deflection of said bar, and means for indicating on an enlarged scale the relative movements of said bar and the free end of said tangent lever including an oscillatable member having a fixed pivot and carrying a scale, means for moving said member about its pivot in accordance with the deflection of said bar, a second oscillatable member pivotally mounted on said first named member and carrying a pointer adapted to register with said scale, and means for oscillating said second oscillatable member about its pivot in accordance with the movements of the free end of said tangent lever.

26. In a thrust bearing, means for measuring the thrust on said bearing comprising a flexible bar, means for transmitting thrust to said bar so as to cause a deflection thereof from the normal, a tangent lever fixed at one end to said bar and free at the other end whereby it tends to place itself tangent to the curve of deflection of said bar, and means for continuously indicating the relative displacement from the normal between the free end of said tangent lever and the adjacent end of said bar as a measure of said thrust.

27. In a thrust bearing, means for measuring the thrust on said bearing comprising a flexible bar, means for transmitting thrust to said bar so as to cause a deflection thereof from the normal, a tangent lever fixed at one end to said bar and free at the other end whereby it tends to place itself tangent to the curve of deflection of said bar, and means for continuously indicating the relative displacement from the normal between the free end of said tangent lever and the adjacent end of said bar as a measure of said thrust including a swinging lever carrying a scale, a second lever pivotally mounted on said swinging lever and carrying a pointer adapted to register with said scale, and means for operatively connecting said swinging lever and said second lever with said flexible bar and said tangent lever, respectively.

28. A device for measuring the thrust load applied to a thrust bearing comprising a pair of relatively movable indicating members for continuously indicating said thrust, a pair of relatively movable elements, means responsive to variations in the thrust load on said bearing for flexing one of said elements relatively to the other, the other of said elements being non-flexible, and means for transmitting the respective movements of said elements due to their relative flexure to the respective indicating members to move the same relatively and show the thrust.

29. A device for measuring the thrust load applied to a thrust bearing comprising a pair of relatively movable indicating members for continuously indicating said thrust, a pair of relatively movable elements, means responsive to variations in the thrust load on said bearing for flexing one of said elements relatively to the other, the other of said elements being non-flexible, means for transmitting the respective movements of said elements due to their relative flexure to the respective indicating members to move the same relatively and show the thrust, said transmitting means also including means for multiplying the amplitude of said movements, and means for damping the resulting movements of said indicating members.

30. A device for measuring the thrust load applied to a thrust bearing comprising a casing, a pair of relatively movable indicating members carried by said casing for continuously indicating said thrust, a pair of relatively movable elements mounted in said casing, means carried by said casing adapted to receive thrust from said bearing and responsive to variations in the thrust load on said bearing for moving said respective elements relatively, and means for transmitting the respective movements of said elements to the respective indicating members, said casing and its contained mechanism constituting a readily attachable and detachable unit mounted on the housing of said bearing.

31. A device for measuring the thrust load applied to a thrust bearing comprising a casing, a pair of relatively movable indicating members carried by said casing for continuously indicating said thrust, a pair of relatively movable elements mounted in said casing, means carried by said casing adapted to receive thrust from said bearing and responsive to variations in the thrust load on said bearing for moving said respective elements relatively, means for transmitting the respective movements of said elements to the respective indicating members, said transmitting means also including means for multiplying the amplitude of said movements, and means for damping the resulting movements of said indicating members, said casing and its contained mechanism constituting a readily attachable and detachable unit mounted on the housing of said bearing.

32. In a thrust bearing of the type embodying a thrust collar and thrust receiving members on both sides thereof, means for indicating the net thrust exerted upon said bearing comprising a member movable bodily in either of two directions in response to the net thrust transmitted thereto from said bearing members, a flexible bar one end of which is secured to and moves with said movable member, means for establishing a fixed fulcrum on either side of said flexible bar whereby movement of its end causes a deflection thereof about said fulcrum as a center, a tangent lever fixedly secured at one end to the end of the flexible bar secured to said movable member and free at the other end whereby it tends to place itself tangent to the curve of deflection of said flexible bar, and means for indicating the amount of relative displacement of the free end of said tangent lever with respect to the adjacent end of said flexible bar as a measure of the net thrust.

33. In a thrust bearing of the type embodying a thrust collar and thrust receiving members on both sides thereof, means for indicating the net thrust exerted upon said bearing comprising a member movable bodily in either of two directions in response to the net thrust transmitted thereto from said bearing members, a flexible bar one end of which is secured to and moves with said movable member, means for establishing a fixed fulcrum on either side of said flexible bar whereby movement of its end causes a deflection thereof about said fulcrum as a center, a tangent lever fixedly secured at one end to the end of the flexible bar secured to said movable member and free at the other end whereby it tends to place itself tangent to the curve of deflection of said flexible bar, and means for indicating the amount of relative displacement of the free end of said tangent lever with respect to the adjacent end of said flexible bar as a measure of the net thrust, including indicating means carried by said flexible bar and means cooperating with the free end of said tangent lever for actuating said indicating means.

34. In a thrust bearing of the type embodying a thrust collar and thrust receiving bearing members on both sides thereof, means for indicating the net thrust exerted upon said bearing comprising a member movable bodily in either of two directions in response to the net thrust transmitted thereto from said bearing members, a flexible bar one end of which is secured to and moves with said movable member, means for establishing a fixed fulcrum on either side of said flexible bar whereby movement of its end causes a deflection thereof about said fulcrum as a center, a tangent lever fixedly secured at one end to the end of the flexible bar secured to said movable member and free at the other end whereby it tends to place itself tangent with the curve of deflection of said flexible bar, and means for indicating on an enlarged scale the amount of relative displacement of the free end of said tangent lever with respect to the adjacent end of said flexible bar as a measure of the net thrust, including a lever pivotally mounted on said flexible bar, a pair of indicating devices mounted on said bar one on each side of one extremity of said last named lever and adapted to be actuated thereby, and means operatively connecting the other extremity of said last named lever with the free end of said tangent lever.

35. In a thrust bearing of the type embodying a thrust collar and thrust receiving bearing members on both sides thereof, the combination with a rigid bar transverse to the axis of said bearing the lateral displacement of which from its normal position is a measure of the net thrust upon said bearing, of means for amplifying and indicating the amount of said lateral displacement as a measure of said thrust comprising a flexible bar perpendicular to said rigid bar and having one end thereof operatively secured to said rigid bar, means for forming a fixed fulcrum on either side of said flexible bar at a point intermediate its ends, means intermediate said fulcrum means and the end of said flexible bar opposite the end mounted in said rigid bar for preventing lateral bodily movement of said flexible bar but permitting flexure thereof, a tangent lever fixedly secured at one end to the mounted end of said flexible bar and free at the other end whereby it tends to place itself tangent to the curve of deflection of said flexible bar caused by movement of said rigid bar, and means for indicating the relative displacement of the free end of said tangent lever with respect to the adjacent end of said flexible bar.

36. In a thrust bearing of the type embodying a thrust collar and thrust receiving bearing members on both sides thereof, the combination with a rigid bar transverse to the axis of said bearing the lateral displacement of which from its normal position is a measure of the net thrust upon said bearing, of means for amplifying and indicating the amount of said lateral displacement as a measure of said thrust comprising a flexible bar perpendicular to said rigid bar and securely mounted at its lower end in a recess formed in said rigid bar, means for forming a fixed fulcrum on either side of said flexible bar at a point intermediate its ends, guide means intermediate said fulcrum means and the upper end of said flexible bar for preventing lateral movement of said flexible bar but permitting flexure thereof, a tangent lever fixedly secured at one end to the lower end of said flexible bar and free at the other end whereby it tends to place itself tangent to the curve of deflection of said flexible bar caused by movement of said rigid bar and the cooperation of said fulcrum and guide means, and means for indicating the relative displacement of the free end of said tangent lever with respect to the adjacent end of said flexible bar.

37. In a thrust bearing of the type embodying a thrust collar and thrust receiving bearing members on both sides thereof, means for indicating the net thrust exerted upon said bearing comprising a rigid bar movable laterally in either direction in response to the net thrust transmitted thereto from said members, a flexible bar secured at one end to said rigid bar, means for establishing a fixed fulcrum on either side of said flexible bar whereby movement of its movable end with said rigid bar causes a deflection thereof about said fulcrum as a center, a tangent lever fixedly secured at one end to the movable end of said flexible bar and free at the other end whereby it tends to place itself tangent to the curve of deflection of said flexible bar, and means for continually indicating the amount of relative displacement of the free end of said tangent lever with respect to the adjacent end of said flexible bar as a measure of the net thrust.

38. In apparatus for indicating the net thrust exerted upon a thrust bearing, a flexible bar, means for moving one end of said bar in a direction and an amount corresponding with the net thrust being exerted, means for establishing a fixed fulcrum intermediate the ends of said bar on either side thereof dependent upon the direction of said net thrust, means adjacent the other end of said bar for restraining lateral bodily movement of said bar but permitting flexure thereof about said fulcrum, and means for indicating the amount of flexure of said bar as a measure of the net thrust.

39. In apparatus for indicating the net thrust exerted upon a thrust bearing, a flexible bar, means for moving one end of said bar in a direction and an amount corresponding with the net thrust being exerted, fluid pressure actuated means for establishing a fixed fulcrum intermediate the ends of said bar on either side thereof dependent upon the direction of said net thrust, means adjacent the other end of said bar for restraining lateral bodily movement of said bar but permitting flexure thereof about said fulcrum, and means for indicating the amount of flexure of said bar as a measure of the net thrust.

40. In apparatus for indicating the net thrust exerted upon a thrust bearing, a flexible bar, means for moving one end of said bar in a direction and an amount corresponding with the net thrust being exerted, means for establishing a fixed fulcrum intermediate the ends of said bar on either side thereof dependent upon the direction of said net thrust including a cylinder located on each side of said bar, a piston in each cylinder, and fluid pressure means for forcing said pistons into contact with said bar to form a fulcrum therefor, means adjacent the other end of said bar for restraining lateral bodily movement of said bar but permitting flexure thereof about said fulcrum, and means for indicating the amount of flexure of said bar as a measure of the net thrust.

41. In apparatus for indicating the net thrust exerted upon a thrust bearing, a flexible bar, means for moving one end of said bar in a direction and an amount corresponding with the net thrust being exerted, means for establishing a fixed fulcrum intermediate the ends of said bar on either side thereof dependent upon the direction of said net thrust including a cylinder located on each side of said bar, a piston in each cylinder, and fluid pressure means for forcing said pistons into contact with said bar to form a fulcrum therefor, means adjacent the other end of said bar for restraining lateral bodily movement of said bar but permitting flexure thereof about said fulcrum, means for indicating the amount of flexure of said bar as a measure of the net thrust, and means for indicating the pressure exerted by said flexible bar against the piston forming said fulcrum as another measure of said net thrust.

42. In apparatus for measuring the thrust exerted upon a thrust bearing, a flexible bar, fluid pressure actuated means for forming a fulcrum for said bar, means for deflecting said bar about said fulcrum from its normal position in proportion to the amount of thrust exerted upon said bearing, mechanical means for indicating the amount of said deflection as a measure of said thrust, and means for indicating the pressure exerted on said fluid pressure actuated fulcrum means as another measure of said thrust.

43. In a thrust bearing of the type having a pair of thrust receiving bearing members located at opposite points with respect to the axis of said bearing, means for measuring the mean thrust exerted upon said members comprising a pair of flexible bars positioned one on each side of the axis of said bearing, fixed fulcrums adjacent each end of each of said bars, means for transmitting the thrust exerted on each of said bearing members to one of said flexible bars intermediate the fulcrums thereof whereby a deflection of each of said bars from the normal is produced proportionate to the thrust exerted on the corresponding bearing member, and means for averaging the deflections of said bars as a measure of the mean thrust.

44. In a thrust bearing of the type having a pair of thrust receiving bearing members located at opposite points with respect to the axis of said bearing, means for measuring the mean thrust exerted upon said members comprising a pair of flexible bars positioned one on each side of the axis of said bearing, fixed fulcrums adjacent each end of each of said bars, means for transmitting the thrust exerted on each of said bearing members to one of said flexible bars intermediate the fulcrums thereof whereby a deflection of each of said bars from the normal is produced proportionate to the thrust exerted on the corresponding bearing member, a pair of tangent levers each secured at one end to one end of one of said flexible bars and free at the other end whereby it tends to place itself tangent to the curve of deflection of its associated bar, and means for averaging the relative displacements of the free ends of said tangent levers with respect to the adjacent ends of said flexible bars as a measure of the mean thrust.

45. In a thrust bearing of the type having a pair of thrust receiving bearing members located at opposite points with respect to the axis of said bearing, means for measuring the mean thrust exerted upon said members comprising a pair of flexible bars positioned one on each side of the axis of said bearing, fixed fulcrums adjacent each end of each of said bars, means for transmitting the thrust exerted on each of said bearing members to one of said flexible bars intermediate the fulcrums thereof whereby a deflection of each of said bars from the normal is produced proportionate to the thrust exerted on the corresponding bearing member, a tangent lever secured at one end to one end of each of said flexible bars and free at the other end whereby it tends to place itself tangent to the curve of deflection of its associated bar, a member connecting the free ends of said tangent levers, a second member connecting the ends of said flexible bars adjacent the free ends of said tangent levers, and means for indicating the relative displacements of the mid-points of said members as a measure of the mean thrust.

46. In a thrust bearing of the type embodying thrust receiving bearing members, means for measuring the thrust on said bearing including an elongated flexible bar having a fulcrum point, means for holding one end of said bar relatively stationary, means for transmitting the thrust from said bearing members to the opposite end of said bar to bend the same, and means for indicating the amount of deflection of said bar as a measure of said thrust.

47. In a thrust bearing of the type embodying thrust receiving bearing members, means for measuring the thrust on said bearing including an elongated flexible bar having a fulcrum point, means for holding one end of said bar relatively stationary, means for transmitting the thrust from said bearing members to the opposite end of said bar to bend the same, a tangent lever fixed at one end to said flexible bar and free at its other end, and means for indicating the amount of displacement between the free end of said tangent lever and the corresponding end of said flexible bar as a measure of said thrust.

48. In a thrust bearing of the type embodying thrust receiving bearing members and a housing therefor, means for transmitting thrust from one or more bearing members whose thrust is normally sustained by said housing, a thrust measuring device including means for receiving the thrust from said thrust transmitting means and means for measuring the thrust received by said last named means, said device constituting a self-contained unit adapted to be mounted as a unit on said housing with said receiving means in engagement with said transmitting means, and means operable from the exterior of said device for rendering said thrust receiving and measuring means operable to measure the thrust transmitted to said receiving means.

49. In a thrust bearing of the type embodying thrust receiving bearing members and a housing therefor, means for transmitting thrust from one or more bearing members whose thrust is normally sustained by said housing, a thrust measuring device including a flexible bar, means for receiving the thrust from said thrust transmitting means and transmitting the same to said bar and means for measuring the deflection of said bar as a measure of the thrust on said bearing, said device constituting a self-contained unit adapted to be mounted as a unit on said housing with said receiving means in engagement with said transmitting means, and means operable from the exterior of said housing for rendering said bar operative to receive thrust from said transmitting means.

50. In a thrust bearing of the type embodying a plurality of thrust receiving bearing members, means for measuring the thrust load upon a bearing member comprising a flexible bar member supported by the thrust bearing housing, means for moving said member into position to receive the thrust being applied to said bearing member, and means for indicating the amount of the flexure of said member from the normal under said thrust as a measure of the thrust load being applied to said bearing member.

51. In a thrust bearing of the type embodying a plurality of thrust receiving bearing members, means for measuring the thrust load upon a bearing member comprising a flexible bar member having a fixed fulcrum, means for applying the thrust load received by said bearing member to said flexible bar member whereby the latter is flexed from its normal position, and means for indicating the amount of said flexure as a measure of the thrust load being applied to said bearing member.

52. In a thrust bearing of the type embodying a plurality of thrust receiving bearing members, means for measuring the thrust load upon a bearing member comprising a flexible bar member fulcrumed at points adjacent the ends thereof, means for applying the thrust load received by said bearing member to said flexible bar member at a point intermediate its fulcrum points whereby said member is flexed from its normal position, and means for indicating the amount of said flexure as a measure of the thrust load being applied to said bearing member.

53. In a thrust bearing of the type embodying a plurality of thrust receiving bearing members, means for measuring the thrust load upon a bearing member comprising a flexible bar member supported by the thrust bearing housing, means for transmitting to said member the thrust being applied to said bearing member, a tangent lever secured at one end to said flexible bar member and free at the other end whereby it tends to place itself tangent to the curve of flexure of said bar member produced by said thrust, and means for indicating the amount of relative displacement between the free end of said tangent lever and said flexible bar member as a measure of the thrust load being applied to said bearing member.

54. A self-contained mechanism for measuring the thrust transmitted to the bearing members of a thrust bearing, comprising a casing, thrust measuring elements housed within said casing, means for transmitting thrust from said bearing members, and means carried by said casing adapted to be engaged with said last named means and cooperating with said measuring elements whereby said elements receive and measure the thrust exerted on said bearing members, said second named means and measuring elements constituting a unit readily attachable to and detachable from the housing of said thrust bearing.

55. A self-contained thrust measuring mechanism adapted for use with a thrust bearing of the type having thrust receiving bearing members and means for normally transmitting the thrusts therefrom to the thrust bearing housing, comprising a casing, thrust measuring elements housed within said casing, means for detachably connecting said casing to the thrust bearing housing, and means carried by said casing and adapted to be engaged with said transmitting means whereby the thrust from said bearing members is transmitted to the measuring elements through the agency of said thrust transmitting means.

56. A self-contained mechanism for measuring the thrust load applied to a thrust bearing comprising a casing, thrust receiving elements mounted within said casing, indicating means adapted to be actuated by movement of said thrust receiving elements, means carried by said casing for transmitting thrust to said elements, and means for connecting said casing and its contained elements as a unit to the thrust bearing housing with said transmitting means engaged with thrust transmitting means of said bearing whereby the thrust load on said bearing is transmitted to said thrust receiving elements.

57. A self-contained mechanism for measuring the thrust load applied to a thrust bearing comprising a casing, relatively movable members mounted within said casing, means for detachably connecting said casing and its contained members as a unit to the thrust bearing housing, means carried by said housing for transmitting the thrust load on said bearing to said relatively movable members and engaged with the thrust transmitting means of said bearing when said casing is in position, and means carried by said casing for indicating the extent of relative movement of said members as a measure of the thrust load being applied to the bearing.

58. A self-contained mechanism for measuring the thrust load applied to the bearing members of a thrust bearing, comprising a casing, a flexible bar member mounted within said casing, means housed within said casing and adapted to receive the thrust from said bearing members and to transmit said thrust to said flexible bar member whereby the latter is flexed from its normal position, means for indicating the amount of said flexure as a measure of the thrust load being applied, and means for connecting said casing and its contained elements as a unit to the thrust bearing housing in position to receive and measure said thrust load.

59. In a thrust bearing for a shaft having a thrust collar, a plurality of bearing members in thrust receiving engagement with one side of said collar, members severally responsive to the thrust load on said bearing members for transmitting the load thereon, and means actuated by said members for indicating the average of unequal thrust loads applied to the several bearing members.

60. In a thrust bearing for a shaft having a thrust collar, a plurality of bearing members in thrust receiving engagement with one side of said collar, members severally receiving the individual thrust loads from said bearing members, and means for averaging the response of said members and indicating the average of the thrust loads thus received as a measure of the mean thrust load being applied to said bearing.

61. In a thrust bearing for a shaft having a thrust collar, a pair of bearing members in thrust receiving engagement with one face of said collar, a member individual to each bearing member and actuated by the thrust load thereon to transmit said thrust load, means for averaging the response of said members, and means for indicating said average as a measure of the mean thrust load on said bearing.

62. In a non-equalizing thrust bearing for a shaft having a thrust collar, a plurality of bearing members in thrust receiving engagement with one face of said collar, a movable member to which the thrust load on each of said bearing members is transmitted, the displacement of each movable member from its normal position being proportionate to the thrust load received thereby, and means for averaging the amounts of said displacements of said movable members as a measure of the mean thrust load on said bearing.

63. In a non-equalizing thrust bearing for a shaft having a thrust collar, a plurality of bearing members in thrust receiving engagement with one face of said collar, a deflectable member associated with each of said bearing members and adapted to receive and be deflected by the thrust load being applied to its associated member, and means for indicating the average of the deflections of said deflectable members as a measure of the mean thrust load on said bearing members.

64. In a thrust bearing, in combination with relatively movable bearing elements, means for measuring the thrust on said elements including a flexible bar, thrust transmitting means between said bar and elements, means supporting said bar so that it is flexed by the thrust transmitted thereto, and a non-flexible bar carried by said flexible bar and cooperating therewith to measure the amount of flexure of said bar.

65. In a thrust bearing, in combination with relatively movable bearing elements, means for measuring the thrust on said elements including a flexible bar, thrust transmitting means between said bar and elements, means supporting said bar so that it is flexed by the thrust transmitted thereto, means for measuring the flexure of said bar comprising a tangent lever attached at one end to said bar, and means for indicating the relative displacement of said lever and bar.

66. In a thrust bearing embodying thrust receiving bearing means, means for measuring the thrust on said bearing including an elongated flexible bar having an intermediate fulcrum point, means for transmitting the thrust on said bearing means to points on said bar at the opposite sides of said fulcrum to bend said bar, and means attached to said bar but unflexed by said load for indicating the slope of curvature of said bar as a measure of said thrust.

67. In a thrust bearing of the type embodying thrust receiving bearing members, means for measuring the thrust on said bearing including an elongated flexible bar having an intermediate fulcrum point, means for transmitting the thrust from said bearing members to points on said bar at opposite sides of said fulcrum point to bend said bar, a tangent lever fixed at one end to said flexible bar and free at its other end, and means for indicating the amount of displacement between the free end of said tangent lever and the corresponding end of said flexible bar as a measure of said thrust.

ALBERT KINGSBURY.